(12) United States Patent
Utsuki et al.

(10) Patent No.: US 8,214,860 B2
(45) Date of Patent: Jul. 3, 2012

(54) IMAGE RETRIEVAL ASSISTING METHOD, IMAGE RETRIEVAL ASSISTING APPARATUS, AND BROADCAST RECEIVING SET

(75) Inventors: Shingo Utsuki, Kanagawa (JP); Keiichi Yoshioka, Tokyo (JP); Hidetoshi Ichioka, Tokyo (JP); Shinichi Wakai, Tokyo (JP); Hiroshi Takagi, Saitama (JP); Yoshiaki Arishima, Kanagawa (JP); Ayako Nakayama, Kanagawa (JP); Koji Fujita, Tokyo (JP); Shigeharu Kondo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/968,813

(22) Filed: Dec. 15, 2010

(65) Prior Publication Data

US 2011/0081091 A1     Apr. 7, 2011

Related U.S. Application Data

(63) Continuation of application No. 10/489,833, filed as application No. PCT/JP03/09190 on Jul. 18, 2003, now Pat. No. 7,882,523.

(30) Foreign Application Priority Data

Jul. 19, 2002   (JP) ................................ 2002-210998

(51) Int. Cl.
    *H04N 5/445* (2011.01)
(52) U.S. Cl. ................................ 725/41; 725/8; 725/43
(58) Field of Classification Search .................... 725/39, 725/44, 45, 59, 52
    See application file for complete search history.

(56) References Cited

U.S. PATENT DOCUMENTS

| 5,027,400 | A |   | 6/1991 | Baji et al. |
| 5,523,796 | A | * | 6/1996 | Marshall et al. ................. 725/41 |
| 5,619,249 | A | * | 4/1997 | Billock et al. ..................... 725/5 |
| 5,621,456 | A |   | 4/1997 | Florin et al. |
| 5,752,160 | A | * | 5/1998 | Dunn .............................. 725/93 |

(Continued)

FOREIGN PATENT DOCUMENTS

EP          0 822 713         2/1998

(Continued)

*Primary Examiner* — Pankaj Kumar
*Assistant Examiner* — Timothy Newlin
(74) *Attorney, Agent, or Firm* — Frommer Lawrence & Haug LLP; William S. Frommer; Thomas F. Presson

(57) ABSTRACT

The present invention enables a user to retrieve his or her desired one of a number of image programs easily and to view it quickly.
An image retrieval assisting apparatus (100) for assisting retrieval of broadcast contents in a broadcast-contents-recording/reproducing apparatus or a broadcast receiving set comprises a classification criterion information storage portion (21) for storing classification criterion for classifying broadcast contents into a plurality of categories, program information acquisition means (23) for acquiring program information of said broadcast contents, program information classification means (27) for classifying said program information into said categories according to said classification criterion, an HDD (29) for storing said classified program information, and display means (31) for displaying said categories defined by said classification criterion horizontally on a monitor screen in a selectable manner and displaying only the program information fallen in a selected category vertically on said monitor screen in a selectable manner.

7 Claims, 14 Drawing Sheets

U.S. PATENT DOCUMENTS

| | | | |
|---|---|---|---|
| 5,809,204 A * | 9/1998 | Young et al. | 386/291 |
| 5,822,123 A * | 10/1998 | Davis et al. | 725/43 |
| 5,850,218 A * | 12/1998 | LaJoie et al. | 725/45 |
| 6,005,631 A | 12/1999 | Anderson et al. | |
| 6,243,145 B1 | 6/2001 | Schlarb et al. | |
| 6,425,129 B1 | 7/2002 | Sciammarella et al. | |
| 6,563,515 B1 | 5/2003 | Reynolds et al. | |
| 6,754,907 B1 | 6/2004 | Schumacher et al. | |
| 6,857,128 B1 | 2/2005 | Borden et al. | |
| 2002/0129371 A1 | 9/2002 | Emura et al. | |

FOREIGN PATENT DOCUMENTS

| | | |
|---|---|---|
| JP | 11-150693 | 6/1999 |
| JP | 11 266413 | 9/1999 |
| JP | 11 298821 | 10/1999 |
| JP | 2000-253325 | 9/2000 |
| JP | 2000 287179 | 10/2000 |
| JP | 2001-148812 | 5/2001 |
| JP | 2002 142153 | 5/2002 |
| WO | WO 99 57890 | 11/1999 |

* cited by examiner

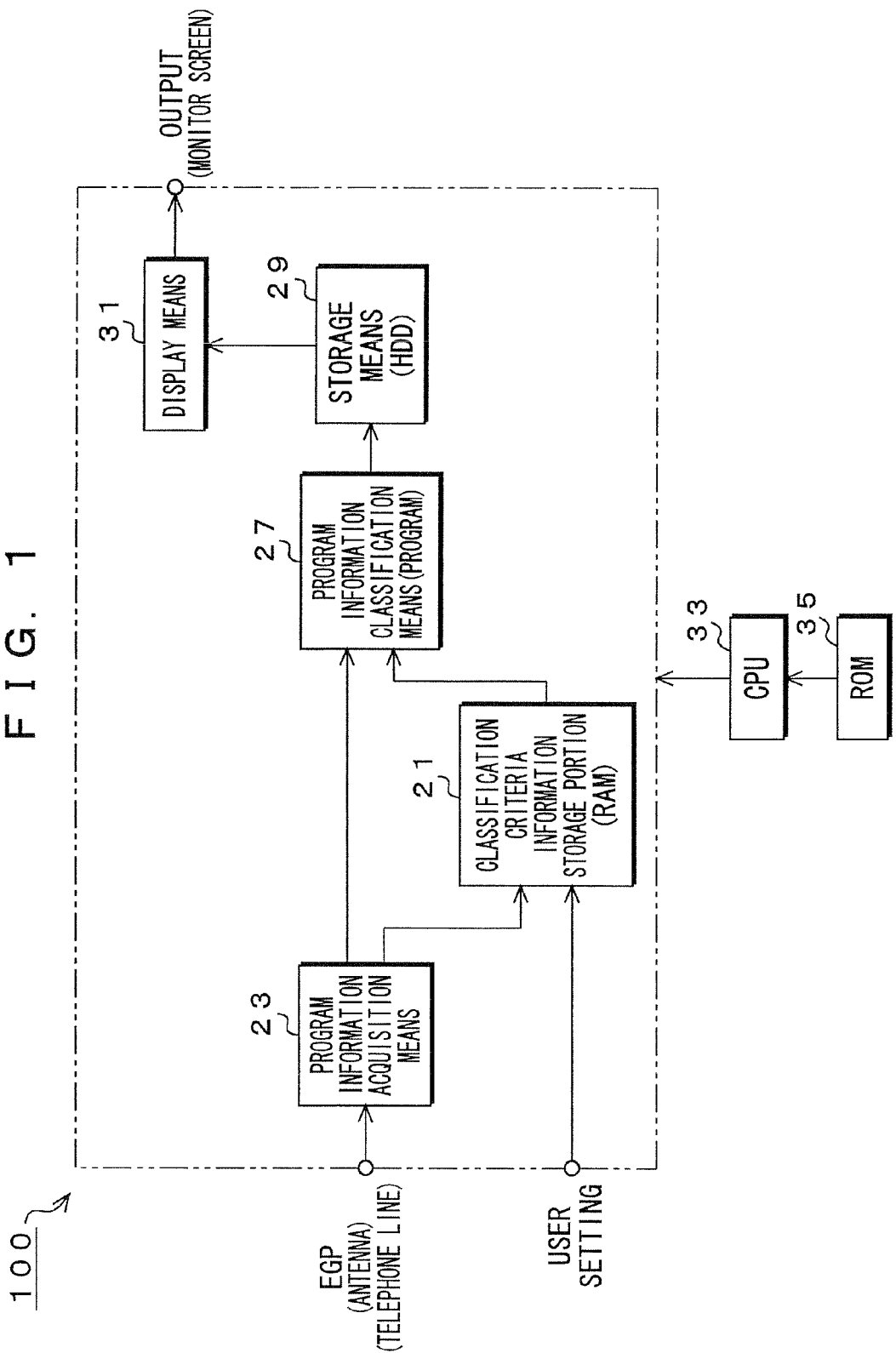

F I G. 2

| CATEGORIES | PROGRAM TITLES | BROADCAST DATE | BROADCAST STARTING TIME | BROADCASTING LAPSE OF TIME | |
|---|---|---|---|---|---|
| SPORTS | SPORTS NEWS ××× | 2003/7/1 | 23:00 | 0:30 | ↑ |
| | NIGHT GAME ○△□ RELAY BROADCAST | 2003/6/30 | 19:00 | 2:00 | |
| | SOCCER | 2003/6/30 | 15:00 | 1:30 | |
| | NIGHT GAME RELAY BROADCAST | 2003/6/28 | 19:00 | 2:00 | |
| | ... | ... | ... | ... | |
| | SKI MOGUL | 2003/6/27 | 15:00 | 1:30 | |
| NEWS | SPORTS NEWS ××× | 2003/7/1 | 23:00 | 0:30 | |
| | NEWS ××× | 2003/7/1 | 22:00 | 0:45 | |
| | NEWS ○△□ | 2003/7/1 | 18:00 | 1:00 | |
| | ... | ... | ... | ... | |
| | NEWS ○△□ | 2003/6/26 | 18:00 | 1:00 | |
| | ... | ... | ... | ... | |
| MUSIC | ○○○ POPULAR MUSIC PRIZE | 2003/7/1 | 20:45 | 1:10 | RECORDED CONTENTS |
| | ○△□ MUSIC | 2003/6/30 | 20:00 | 0:45 | |
| | ... | ... | ... | ... | |
| MOVIE | ××× THEATER | 2003/7/1 | 1:02 | 2:10 | |
| | ... | ... | ... | ... | |
| VARIETY | ○△□ COMEDY SHOW | 2003/6/29 | 19:00 | 2:00 | |
| | HeyHeyHey! | 2003/6/29 | 18:00 | 1:00 | |
| | ... | ... | ... | ... | |
| RECENCY | SPORTS NEWS ××× | 2003/7/1 | 23:00 | 0:30 | |
| | NEWS ××× | 2003/7/1 | 22:00 | 0:45 | |
| | ○○○ POPULAR MUSIC PRIZE | 2003/7/1 | 20:45 | 1:10 | |
| | NEWS ○△□ | 2003/7/1 | 18:00 | 1:00 | |
| | ... | ... | ... | ... | |
| | ××× THEATER | 2003/7/1 | 1:02 | 2:10 | ↓ |
| LIVE | ×× SHOW "HeyHeyHey" | 2003/7/1 | 23:00 | 2:00 | ↕ ON AIR |
| | MIDNIGHT NEWS | 2003/7/1 | 23:50 | 0:50 | |
| | ... | ... | ... | ... | |

FIG. 13
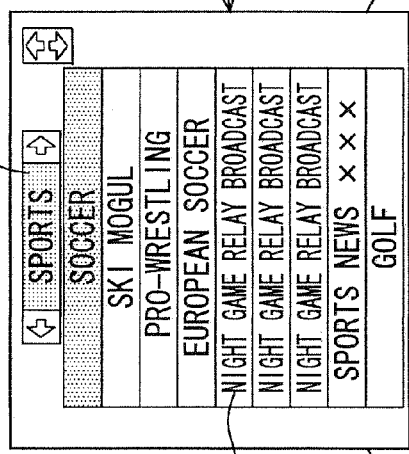
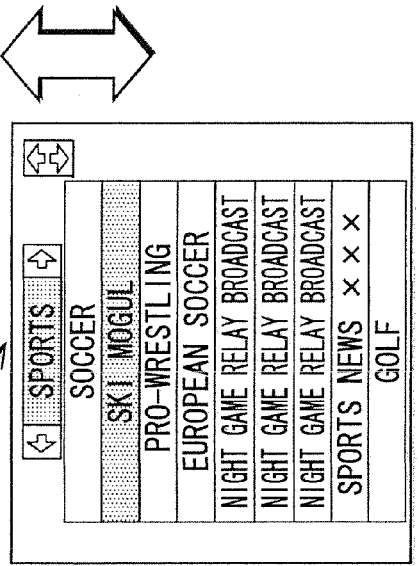
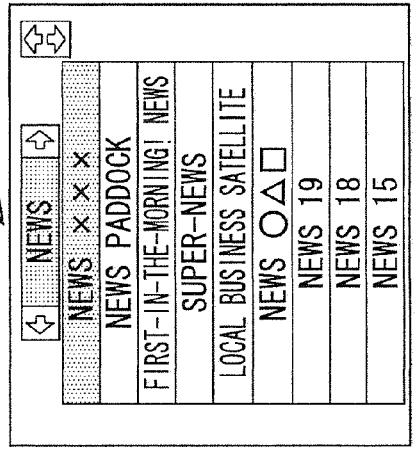

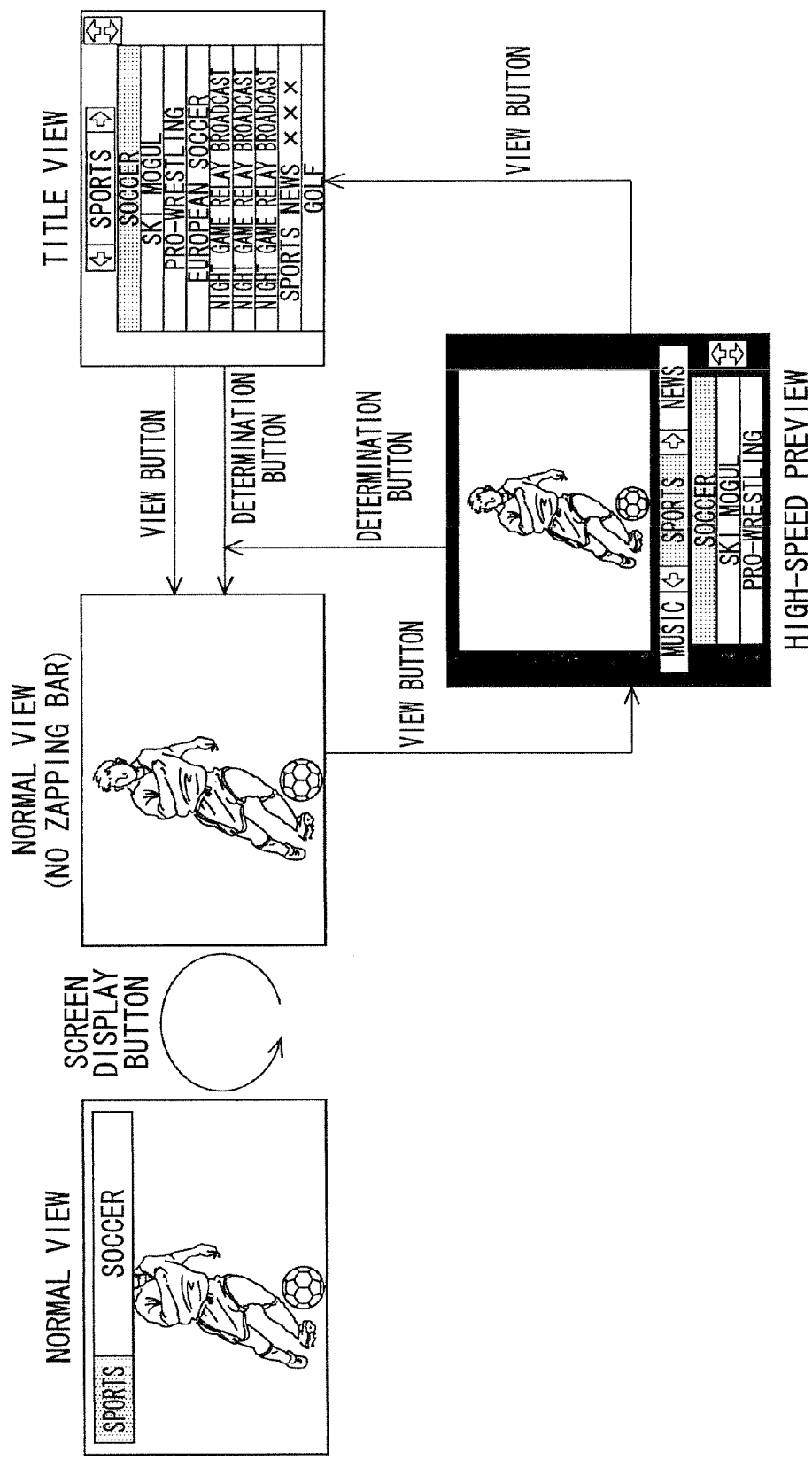

IMAGE RETRIEVAL ASSISTING METHOD, IMAGE RETRIEVAL ASSISTING APPARATUS, AND BROADCAST RECEIVING SET

This is a Continuation of U.S. Ser. No. 10/489.833, filed on Mar. 17, 2004 now U.S. Pat. No. 7,882,523, which is a 371 of PCT/JP03/09190 filed on Jul. 18, 2003 that claims a priority to Japanese Application No. 2002-210998 filed on Jul. 19, 2002, the entirety all of which are hereby incorporated by reference herein.

TECHNICAL FIELD

The present invention relates to an image retrieval assisting method, an image retrieval assisting apparatus, and a broadcast receiving set, which are well applicable to a method and an apparatus for retrieving a desired program among a number of recorded TV programs in a TV receiver having a function to record and reproduce the TV programs.

More specifically, it relates to those which define beforehand classification criterion for classifying image programs into a plurality of attributes, to display in a selectable manner the attributes classified by the defined classification criterion in a first direction on a monitor screen and display in a selectable manner only program information of the programs that fall in a selected one of the attributes in a second direction on the monitor screen so that a user can retrieve his or her desired program among a number of the image programs easily and quickly.

BACKGROUND ART

With recent prevalence of digital broadcasting, a digital video recording apparatus, a personal computer, etc. have been developed for recording digital videos comprising image and audio on a hard disk. The digital video recording apparatus, in which digital videos can possibly be compressed at a high rate, is capable of recording a number of image programs (TV programs). Further, with an appearance of a digital video disk-random access memory (DVD-RAM) changer and an increase in capacity of hard disk, it has been possible to record further more image programs as digitized.

To retrieve such the recorded image programs, there are such methods available for retrieving the recorded images by fast-forwarding or rewinding them as watching them actually or attaching indexes to image programs when recording them beforehand so that a viewer may retrieve his or her desired one of the image programs as watching the indexes listed on a screen.

Further, as more and more image broadcasts (TV broadcasts) have been digitized, program information on the image programs has been broadcast with it being superimposed on images. It is generally referred to as an electronic program guide (EPG). The EPG includes keywords of categories (genres), titles (program names) of image programs, and performers. In present-day digital satellite broadcasting, this EPG is displayed on a screen to enable retrieving a desired channel. Further, started has a broadcasting service with an EPG being embedded in a vertical blanking interval (VBI), which is a blank region in a surface wave.

With advancing of such the broadcasting service, a method has been proposed for using information in the EPG as a retrieval index. In this case, when an image program is recorded, an EPG of this image program is also saved on a hard disk etc. Then, when the recorded image programs (hereinafter referred to as "recorded programs" also) are viewed, titles of the recorded programs are displayed as listed on a TV screen. Accordingly, a user retrieves his or her desired one of the programs on a list of their titles.

By this recorded program retrieval method, an EPG that indicates contents of programs such as their titles is displayed in a list on a TV screen, thus allowing the user to look for his or her desired recorded program with confirming the program titles etc., which is convenient.

Furthermore, utilizing the above-mentioned EPG allows program-recording functions to be also sophisticated. For example, it is also possible to instruct recording of an image program directly from its title or to specify a keyword of a category or a performer included in the EPG to record a program that matches this keyword automatically. Further, as disclosed in Japanese Patent Application Publication No. 2000-253325, a method is known for analyzing a user's viewing history to record apparent programs of his preference automatically and present a predetermined recommendation degree to the user.

Note here that by the conventional method for retrieving recorded programs, a user has looked for his or her desired program with him or her actually watching images of recorded programs by fast-forwarding or rewinding them. Therefore, the user needs to perform complicated and troublesome operations such as fast-forwarding or rewinding with him or her watching a TV screen and also specify his or her desired program based on his or her memory and so is burdened heavily, which is a problem.

Further, by the method for attaching indexes to programs when they are recorded so that a user may look for his or her desired one of the programs in a list of these indexes displayed on a screen, the user retrieves the image programs based on the indexes and so is less burdened somewhat than the one in the case where he or she is engaged in fast-forwarding or rewinding. However, information of the indexes comprises only recorded date and time, so that there still exists a problem that other information must depend on user's hunch and memory. In particular, in the case of automatic recording of image programs, it is extremely difficult for a user to recall contents of the recorded programs only from the recorded date and time, thus giving rise to a problem that the more saved image programs, the more burdens are inflicted on the user.

Further, according to the retrieval assisting method by use of the above-mentioned EPG, recorded programs as well as the EPG have been saved beforehand so that a user may watch a list of title of the recorded programs displayed on a screen when he or she views them.

Accordingly, if too many recorded programs are saved, their titles overflow from one screen when they are listed, thus giving rise to a problem that retrieval of indexes becomes troublesome. Further, in a case where programs are automatically recorded together with their titles, it may be difficult for the user to recall contents of the programs only from its program information.

DISCLOSURE OF THE INVENTION

To solve these problems, the present invention has been developed and, it is an object of the present invention to provide an image retrieval assisting method, an image retrieval assisting apparatus, and a broadcast receiving set that enable a viewer to easily retrieve his or her desired one of a number of image programs and quickly view it.

These problems can be solved by an image retrieval assisting method for assisting retrieval of image programs comprising the steps of defining beforehand classification criterion for classifying the image programs into a plurality of attributes, acquiring program information of the image programs, classifying the program information into the attributes according to the classification criterion, and displaying the attributes defined by the classification criterion in a first direction on a monitor screen in a selectable manner and displaying only the program information of the programs fallen in a selected one of the attributes in a second direction on the monitor screen in a selectable manner.

According to such the image retrieval assisting method related to the present invention, a user can select attribute of his or her desired image program with him or her searching for the attributes of the image programs on the monitor screen in the first direction and then retrieve his or her desired image program in the second direction on the monitor screen with him or her watching only the program information fallen in the selected attribute thereon.

Therefore, the user can easily retrieve his or her desired one of a number of image programs and quickly view the desired image program.

An image retrieval assisting apparatus for assisting retrieval of image programs related to the present invention comprises a classification criterion information storage portion for storing classification criterion for classifying the image programs into a plurality of attributes, program information acquisition means for acquiring program information of the image programs, program information classification means for classifying the program information into the attributes according to the classification criterion, a program information storage portion for storing the classified program information, and display means for displaying the attributes defined by the classification criterion in a first direction on a monitor screen in a selectable manner and displaying only the program information of the programs fallen in a selected one of the attributes in a second direction on the monitor screen in a selectable manner.

According to such the image retrieval assisting apparatus related to the present invention, a user can select an attribute of his or her desired image program with him or her searching for the attributes of the image programs in the first direction on the monitor screen and then retrieve the desired image program in the second direction on the monitor screen with him or her watching only the program information fallen in the selected attribute thereon.

It is thus possible for a user to easily retrieve his or her desired one of a number of image programs and quickly view it. Further, since the user does not need to retrieve program information of those that do not fall in the selected attribute, he or she is less burdened in channel selection.

Furthermore, even if the user has not yet decided which program he or she watches, he or she can easily find such image program (s) as to match his or her preference, which is convenient.

A broadcast receiving set related to the present invention having a function to record and reproduce image programs comprises a classification criterion information storage portion for storing classification criterion for classifying the image program into a plurality of attributes, program information acquisition means for acquiring program information of the image programs, program information classification means for classifying the program information into the attributes according to the classification criterion, a program information storage portion for storing the classified program information, and display means for displaying the attributes defined by the classification criterion in a first direction on a monitor screen in a selectable manner, displaying only program information of the programs fallen in a selected one of the attributes in a second direction on the monitor screen in a selectable manner, and displaying an image program corresponding to the selected program information on the monitor screen.

According to the broadcast receiving set related to the present invention, since the above-mentioned apparatus for assisting retrieval of image programs is applied to it, a user can select an attribute of his or her desired image program with him or her searching for the attributes of the image programs in the first direction on the monitor screen and then retrieve the desired image program in the second direction on the monitor screen with him or her watching only the program information fallen in the selected attribute thereon.

It is thus possible for the user to easily retrieve his or her desired one of a number of image programs and quickly view it.

BRIEF DESCRIPTION OF THE DRAWINGS

FIG. 1 is a block diagram for showing an example of a configuration of an image retrieval assisting apparatus 100 related to an embodiment of the present invention;

FIG. 2 is a table for showing a management table of image programs;

FIG. 13 is a conceptual diagram for showing an example of retrieving contents in a title list view mode; and FIG. 14 is a conceptual diagram for showing a transition example in a screen display mode.

BEST MODE FOR CARRYING OUT THE INVENTION

Figure 3:
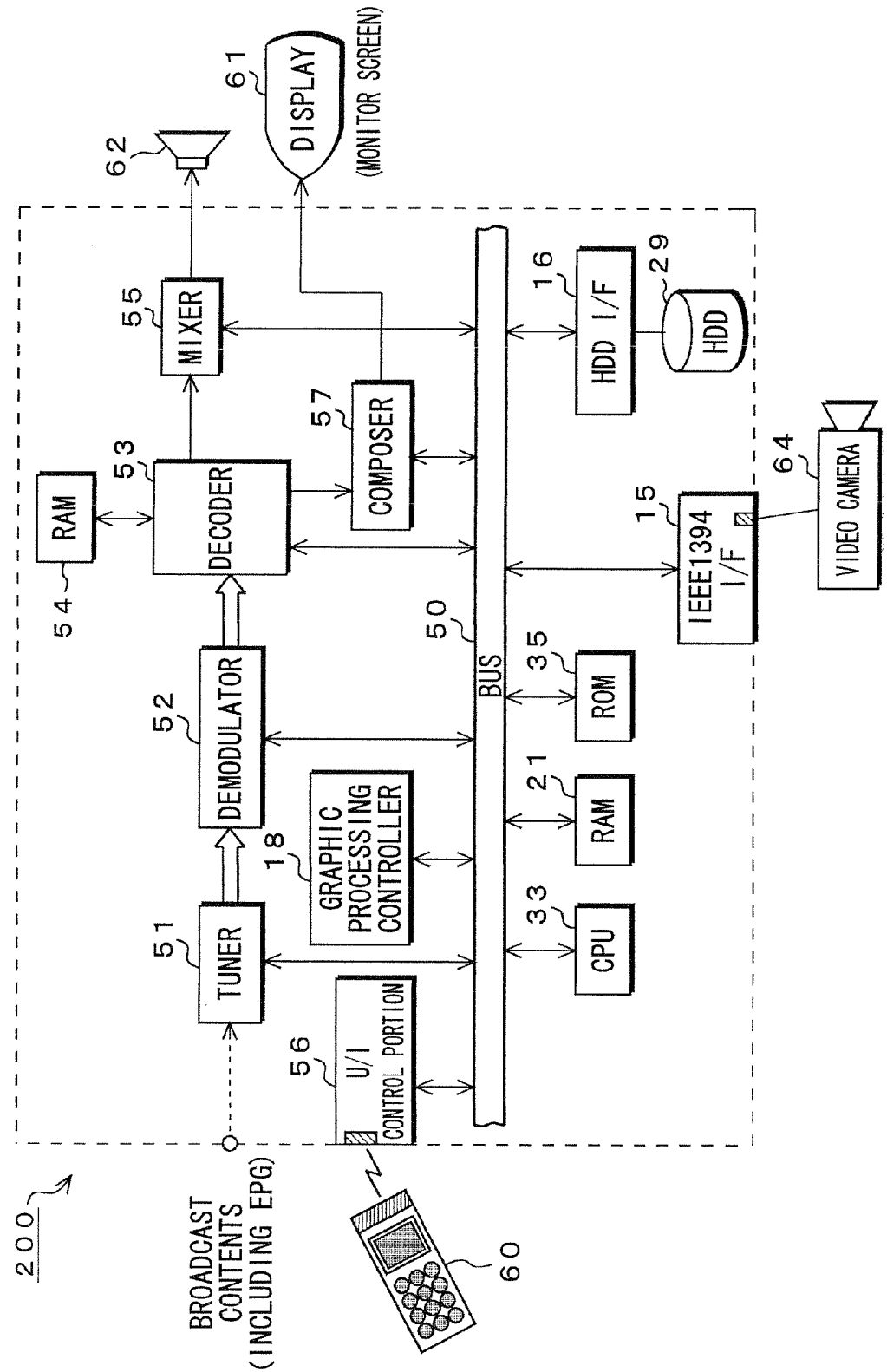
FIG. 3 is a block diagram for showing an example of a configuration of a TV set 200 related to the embodiment of the present invention.

The following will describe an image retrieval assisting method, an image retrieval assisting apparatus and a broadcast receiving set, which are related to embodiments of the present invention, with reference to drawings.

(1) EMBODIMENTS

According to the present embodiment, in order to assist retrieval of image programs, classification criteria for classifying the image programs into a plurality of attributes is defined beforehand, program information of the image programs is then acquired to classify the program information into the attributes according to the classification criteria, and the attributes defined by the classification criteria are further displayed in a first direction, for example, a horizontal direction on a monitor screen in a selectable manner and only the program information of the programs fallen in a selected one of said attributes is displayed in a second direction, for example, a vertical direction on said monitor screen in a selectable manner so that a viewer can easily retrieve his or her desired one of the many image programs and quickly view it.

FIG. 1 is a block diagram for showing an example of a configuration of an image retrieval assisting apparatus 100 related to the embodiment of the present invention. This image retrieval assisting apparatus 100 is installed in a recording/reproducing apparatus for recording and reproducing image programs, a reproducing apparatus for reproducing image programs, a broadcast receiving set having a recording/reproducing function, etc. This image retrieval assisting apparatus 100 classifies EPGs of image programs broadcast from broadcast stations in an ever-changing manner (hereinafter referred to as "broadcast contents" also) or image programs recorded (hereinafter referred to as "recorded contents" also) into a plurality of attributes based on their contents, and displays the EPGs on a monitor screen for each of the attributes. On the monitor screen, names of the contents, that is, names of the programs (hereinafter referred to as "program titles" also) are displayed along a time axis.

As shown in FIG. 1, this image retrieval assisting apparatus 100 comprises a classification criteria information storage portion 21, program information acquisition means 23, program information classification means 27, storage means 29, display means 31, a central processing unit (CPU) 33, and an ROM 35.

In FIG. 1, to the program information acquisition means 23, for example, an antenna (not shown) is connected, while to the display means 31, a monitor screen (not shown) such as a broadcast receiving set is connected. Further, the classification criteria information storage portion 21 is provided with an external input terminal.

The program information acquisition means 23 has a function to acquire an EPG, which is sent with it being superimposed on broadcast contents in digital broadcasting such as satellite broadcasting. The EPG acquired by the program information acquisition means 23 includes keywords such as program attributes (hereinafter referred to as "categories" or "genres" also), program titles, and performers. It is to be noted that this program information acquisition means 23 can be connected to a telephone line or the like to acquire EPGs disclosed on the Internet also.

The classification criteria information storage portion 21 stores classification criteria for classifying into a plurality of categories recorded contents and broadcast contents received by a broadcast receiving set etc. The classification criteria include, for example, "news", "sports", "music", "movie", "variety", "recency", etc. "Recency" refers to a category that includes all contents within a lapse of time of 24 hours as measured from a starting time point of recording, for example. As the classification criteria, a category to which a company that supplies the EPG sets each of the broadcast contents can be used as it is. Further, a user may set the classification criteria arbitrarily. In this case, the classification criteria information storage portion 21 stores a desired classification criterion (category) through an external terminal of the image retrieval assisting apparatus 100.

The program information classification means 27 classifies the EPGs acquired by the program information acquisition means 23 according to classification criteria stored in the classification criteria information storage portion 21. For example, if an EPG that is sent from a broadcast station with it being superimposed on the broadcast contents includes a keyword "news", the broadcast contents are classified into a category "news". This program information classification means 27 is constituted of, for example, a classification processing program, which is executed by the later-described CPU 33. The storage means 29 stores a management table for managing recorded contents or contents on air. EPGs (program titles, recorded date and time of contents, etc.) classified for each category by the program information classification means 27 is managed on this management table.

FIG. 2 is a table for showing a management table stored in the storage means 29. In the management table shown in FIG. 2, columns are provided for respectively writing "categories", "program titles", "broadcast date", "broadcast starting time", and "broadcasting lapse of time" from the left end. Into these columns, contents of EPGs classified by the program information classification means 27 (see FIG. 1) are written.

That is, in the "categories" columns, classification criteria stored in the above-mentioned classification criteria information storage portion 21 are written. They are, for example, "new's", "sports", "music", "movie", "variety", "recency", etc. Further, "live" is also provided for managing contents on air. For example, from FIG. 2, it can be known that a program title "soccer", which should be classified into "sports", has been broadcast for one and a half hours starting from 15:00 on Jun. 3, 2003. Further, it can be known that "HeyHeyHey", which should be classified into "live", is being broadcast starting from 23:00 on Jul. 1, 2003 and scheduled to end at 1:00 on Jul. 2, 2003.

Furthermore, in the management table shown in FIG. 2, in each of the categories, the program titles are arranged in chronological order with respect to broadcast (recorded) date/broadcast starting time. For example, as shown in FIG. 2, the more recent program titles are arranged higher and the less recent ones are arranged lower.

Note here that in FIG. 2, "sports news xxx" is classified so as to fall in all of "news", "sports", and "recency". This is because the "sports news xxx" is within a lapse of time of 24 hours since it has been recorded and its EPG includes keywords of both "news" and "sports". The user can retrieve this "sports news xxx" in the categories of any one of "news" and "sports", which is convenient.

It is to be noted that this management table may be provided with columns for a broadcast station name and other information besides the columns for the program title, the broadcast date/time, and the like. Further, the arrangement of the program titles is not limited to chronological order. For example, in the column of "live", it may be set that Channel 1 of broadcast station is arranged at the top and Channel 12 of broadcast station is arranged at the bottom. Further, it may be set that in the categories other than "live", the display order may be set depending on whether recorded contents are already reproduced or not.

Referring back to FIG. 1, the display means 31 has a function to display the EPGs stored in the storage means 29 on the monitor screen for each category in response to a control signal from the CPU 33, which will be described later. Forms in which contents are displayed on the monitor screen will be described later.

The CPU 33, which is a main controller of this image retrieval assisting apparatus 100, has a function to distribute control signals to various components of the image retrieval assisting apparatus 100, control their operations, and manage their statuses. This CPU 33 is adapted to execute various applications on a platform which is provided by the operating system (OS).

The ROM (read only memory) 35 stores programs required for operating the CPU 33. They include, for example, a self-diagnosis/initialization program, which is executed upon power application of the image retrieval assisting apparatus 100, control codes of the image retrieval assisting apparatus 100, and the like.

Note here that although the image retrieval assisting apparatus 100 are separated from the monitor screen and the antenna in configuration in FIG. 1, they may be integrated altogether. Further, this image retrieval assisting apparatus 100 may be integrated with the recording/reproducing apparatus, the reproducing apparatus, or the broadcast receiving set in configuration.

FIG. 3 is a block diagram for showing an example of a configuration of a TV set 200 related to the embodiment of the present invention. This a) TV set 200 is formed by integrating the above-mentioned image retrieval assisting apparatus 100 and the broadcast receiving set having a recording/reproducing function. The following will describe hardware components of this TV set 200 in relation to the image retrieval assisting apparatus 100 shown in FIG. 1.

As shown in FIG. 3, in the TV set 200, the CPU 33 serving as the main controller is connected to the various hardware components through a bus 50 and conducts governing control on these components.

A broadcast wave received by the antenna is supplied to a tuner 51. The broadcast wave is given in a defined format and may include an EPG. The broadcast wave may be a surface wave, a satellite wave, a wireline wave, or a wireless wave.

The tuner 51 performs tuning, that is, selects a station for a broadcast wave of a predetermined channel in accordance with an instruction from the CPU 33 and outputs received data to a demodulator 52 provided on its downstream side. The demodulator 52 demodulates the received data which has undergone digital modulation. Note here that the tuner 51 can be altered or expanded in configuration depending on whether the broadcast wave transferred is an analog or digital one.

For example, in the case of digital satellite broadcasting, digital data demodulated from a received broadcast wave is a "transport stream", which is formed by multiplexing AV data compressed according to MPEG2 (moving picture experts group 2) and data for data broadcasting. The former AV data is information of an image and an audio that constitute a body of broadcast contents. The latter data for data broadcasting, on the other hand, is an EPG that accompanies this body of broadcast contents. Note here that a transport stream complies with the regulations of "transport layer" as referred to in the Open Systems Interconnection (OSI) reference model.

A decoder 53 interprets this transport stream to separate it into the AV data compressed according to MPEG2 and the data for data broadcasting. Furthermore, it separates the real-time AV data compressed according to the MPEG2 standards into compressed image data and compressed audio data.

It further performs decompression processing on the image data according to MPEG2 to reproduce an original image signal and performs pulse code modulation (PCM) decoding on the audio data and then synthesizes it with an addition sound to provide a reproduced audio signal. The reproduced image signal is output via a composer 57 to be displayed on a display 61, while the reproduced audio signal is output via a mixer 55 to a speaker 62.

The decoder 53 may be equipped with a memory 54 for storage of work data locally for itself. The decoder 53 transmits the data for data broadcasting separated from the transport stream to the CPU 33 through the bus 50.

A user interface control portion 56 is a module for processing input operations from the user and has a function to accept remote-control operations from a later-described remote controller 60, for example, The RAM (random access memory) 21, which is the classification criteria information storage portion shown in FIG. 1, stores classification criteria for classifying the categories of contents as described above. It is further used to load execution program codes for the CPU 33 or write work data for the execution programs.

An IEEE1394 interface 15 is a serial high-speed interface capable of transmission/reception of data having a rate of about several 10 MBps. To an IEEE1394 port, external devices accommodating IEEE1394 can be connected in a daisy chain or a tree. The devices accommodating IEEE1394 may include, for example, a video camera 64, a scanner (not shown), etc.

A hard disk drive (hereinafter referred to as "HDD" also) 29 is the storage means shown in FIG. 1. This HDD 29 is capable of accumulating the management table of the recorded contents shown in FIG. 2 and a lot of received image and audio information etc. in a defined file format. It is an external memory device capable of random access and has a large capacity of, for example, about several tens of gigabytes (or not less than 100 gigabytes). The HDD 29 is connected via a hard disk interface 16 to the bus 50. To realize the present invention, preferably the mass-capacity external memory device is capable of high-speed random access, not limited to a hard disk drive.

In response to a command from the remote controller 60 etc., the CPU 33 issues instructions to record or reproduce broadcast contents, to the various hardware components. Further, these hardware components are adapted to be always ready for recording irrespective of whether a command is given from the remote controller 60.

In the recording operation, an MPEG2 stream that has not yet decompressed is transferred from the decoder 53 to the HDD 29. The data transmission mode is not limited in particular and may be the program 10 (PIO) transmission mode, the direct memory access (DMA) transmission mode, etc. In the HDD 29, various broadcast contents recorded are accumulated in accordance with the management table shown in FIG. 2.

Further, in reproduction of the recorded contents, an MPEG2 stream taken out of the HDD 29 is transferred via the bus 50 to the decoder 53. As in the case of reception, the decoder 53 separates the stream into compressed image data and compressed audio data, which then undergo MPEG2 decompression processing to be restored as the original image data and audio data and reproduced.

A graphic processing controller 18 is a dedicated controller for generation of a later-described zapping bar 40 or the like in accordance with a drawing instruction issued by the CPU 33. It has a drawing capability equivalent to, for example, a super video graphic array (SVGA) or an extended graphic array (XGA).

To superimpose one on the other a reproduced image restored by the decoder 53 through MPEG2 decompression processing and the zapping bar 40 generated by the graphic processing controller 18, at least two screens are synthesized by the composer 57.

In FIG. 3, the tuner 51 as well as the demodulator 52 and the decoder 53 have the functions of the program information acquisition means 23 shown in FIG. 1. Further, display means of the TV set 200 is constituted of the graphic processing controller 18, the mixer 55, the composer 57, the display 61, and the speaker 62. The display means of the TV set 200 constituted of these hardware components has the functions of the display means 31 shown in FIG. 1 as well as functions to (reproduce and) display selected (recorded) contents and programs on the monitor screen.

Figure 4:
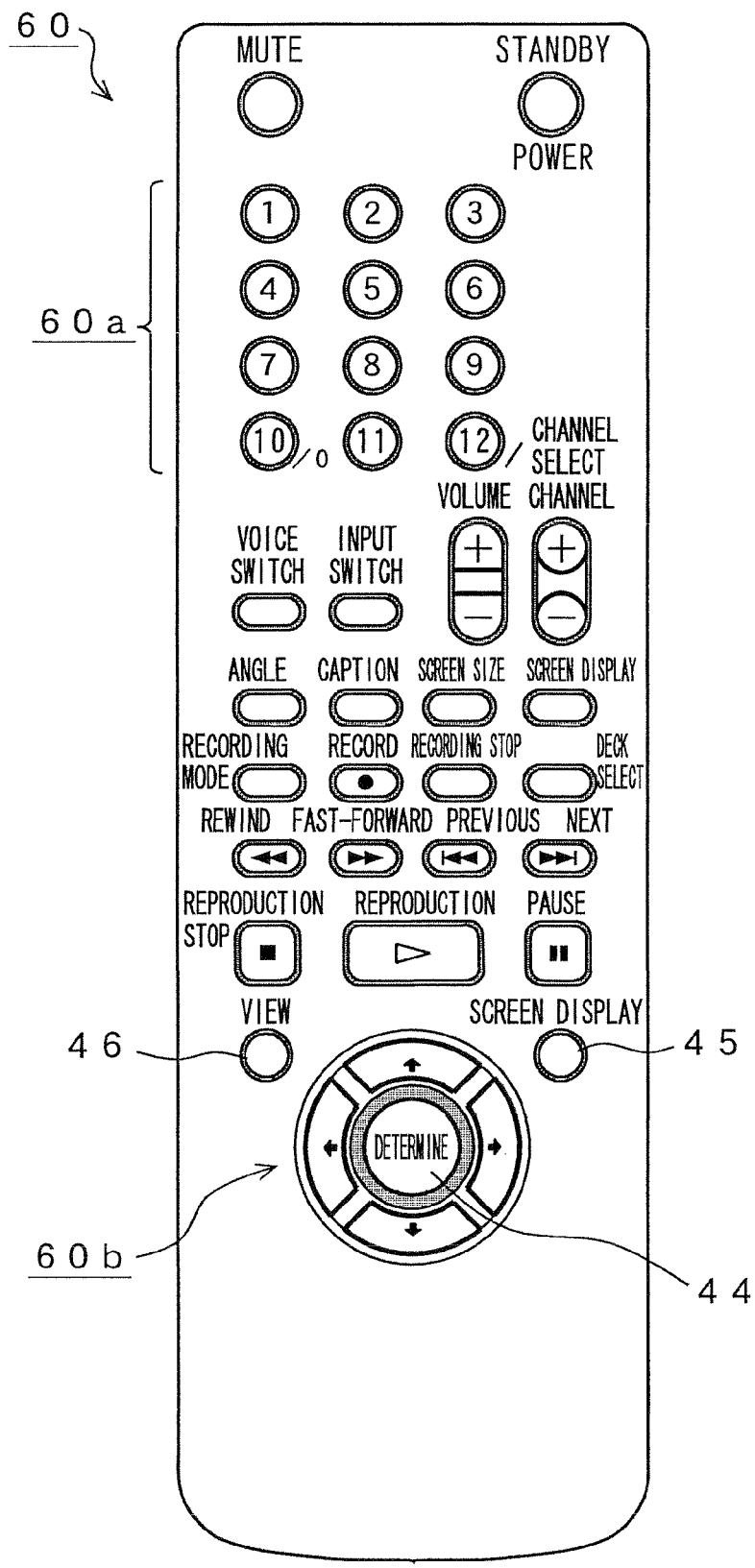
FIG. 4 is a plan view for showing an example of a configuration of an operation panel of a remote controller 60.

The following will describe the remote controller 60 for outputting a control signal to the TV set 200 shown in FIG. 3. FIG. 4 is a plan view of the remote controller 60 for showing an example of a configuration of an operation panel thereof. As shown in FIG. 4, on the Operation panel, there are arranged a numeric key group 60*a* assigned for direct channel selection on broadcast contents, which are broadcast from a broadcast station and a cursor key group 60*b* assigned for vertical movement and horizontal movement.

The cursor key group 60*b* includes a determination button 44 positioned roughly at its midpoint, upward-movement and downward-movement keys positioned above and below it respectively, and rightward-movement and leftward-movement keys positioned on its right and left sides respectively. The rightward and leftward cursor keys (hereinafter referred to as "right and left cursor keys" also) are assigned for selection operation of "category" shown in FIG. 2. Hereinafter, this category selection operation is referred to as "zapping" also. Further, the upward and downward cursor keys (hereinafter referred to as "up and down cursor keys" also) are assigned for selection operation of "program title" shown in FIG. 2. Hereinafter, this program title selection operation is referred to as "warping".

Furthermore, besides the numeric key group 60*a* and the cursor key group 60*b*, the remote controller 60 is provided thereon with, for example, instruction buttons for stopping, rewinding, fast-forwarding, reproducing, pausing, recording, etc. as well as sound volume adjusting and sound switching buttons etc. Further, this remote controller 60 is provided thereon with a screen display button 45, a View button 46, etc. Functions assigned to the screen display button 45 and the View button 46 will be described later.

Figure 5:
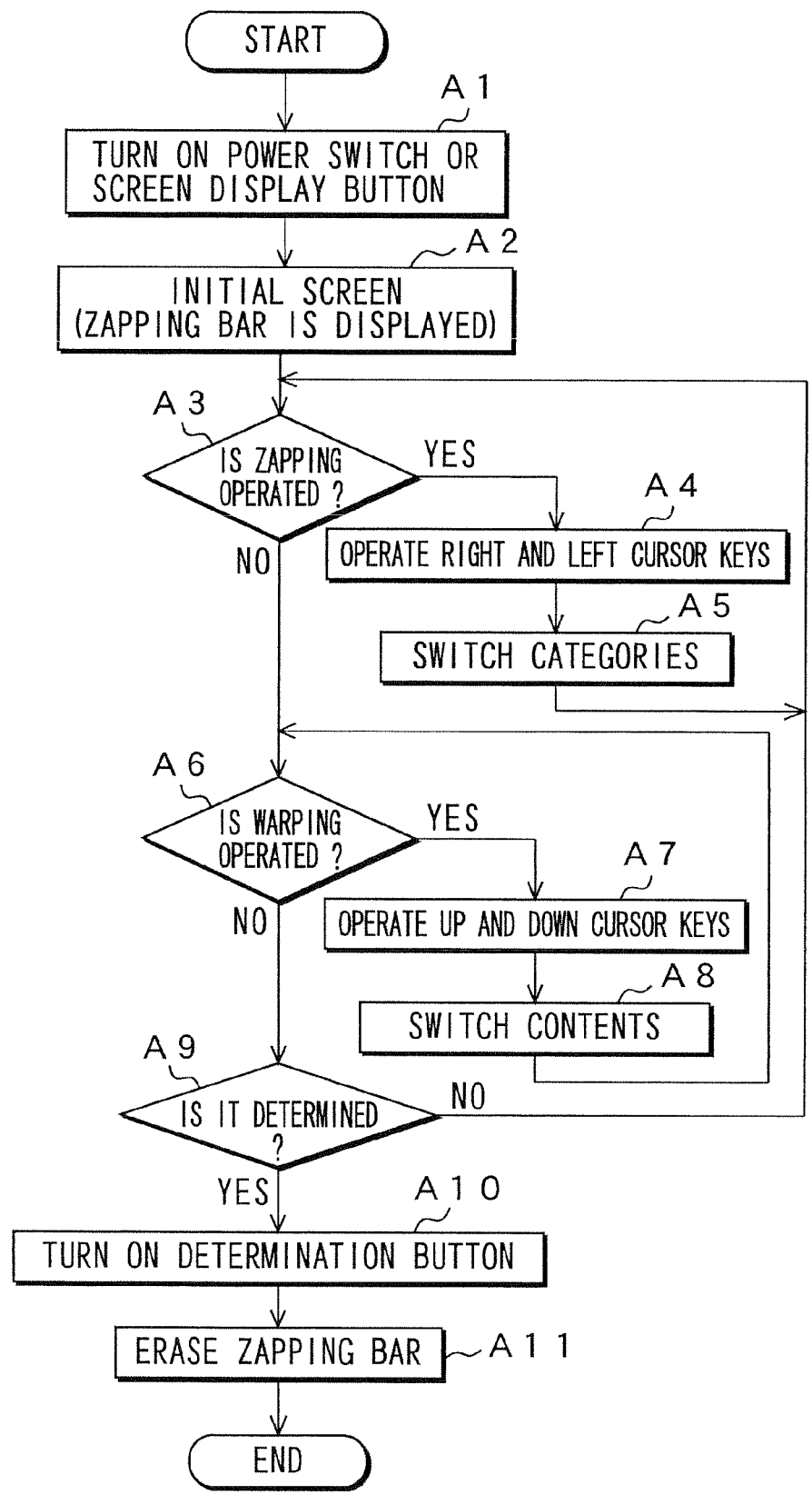
FIG. 5 is a flowchart for showing an operation example of contents switching.
Figure 8A:
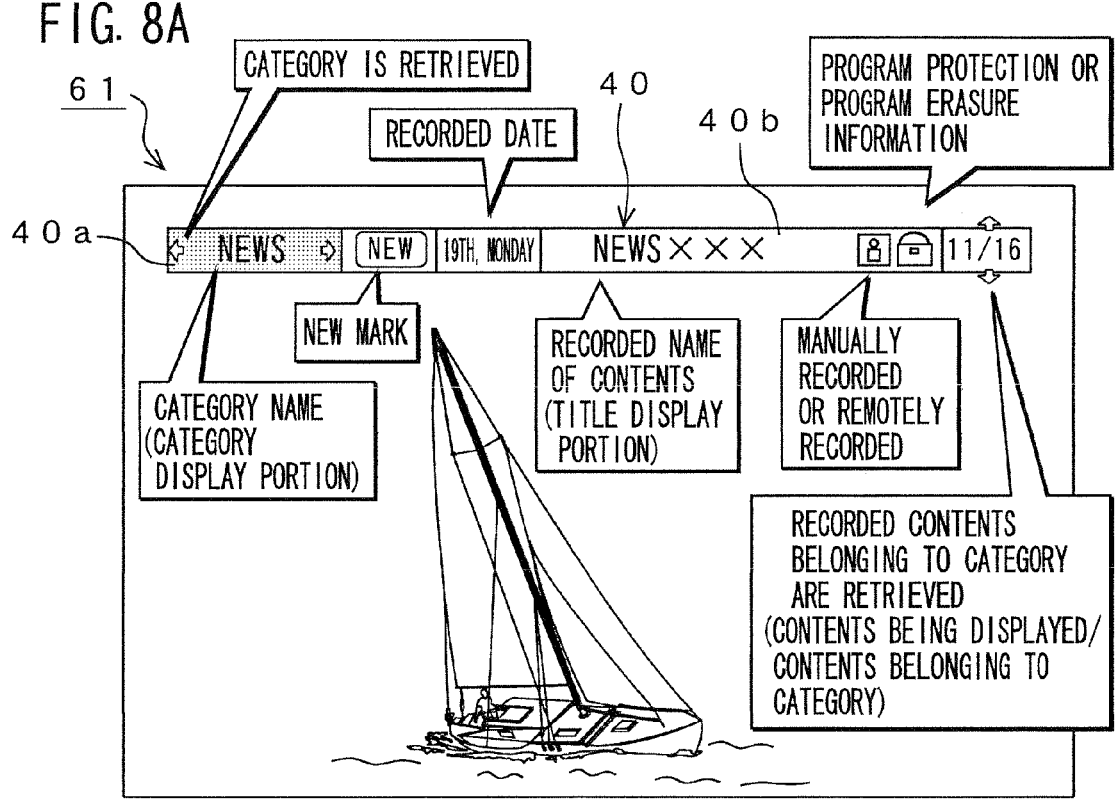
FIG. 8A is a conceptual diagram for showing a display example of an initial screen when recorded contents are reproduced.
Figure 8B:
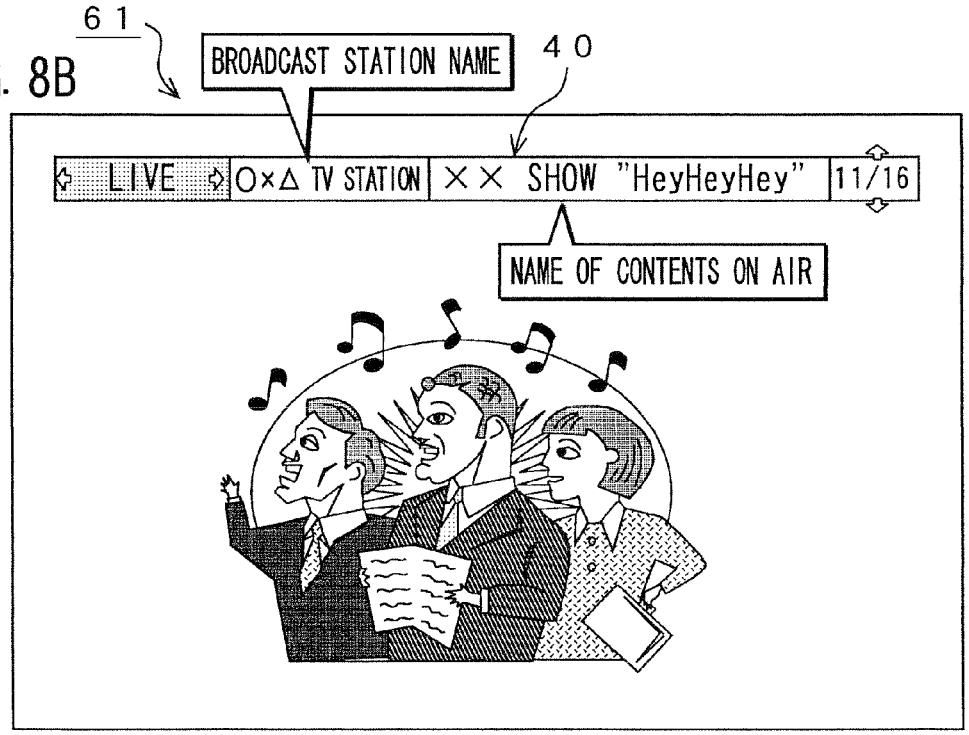
FIG. 8B is a conceptual diagram for showing a display example of the initial screen when broadcast contents are reproduced.

The following will describe a method for retrieving contents in the above-mentioned TV set 200. FIG. 5 is a flowchart for showing an operation example of contents switching. First, at step A1 in FIG. 5, a power supply switch of the TV set 200 shown in FIG. 3 is turned on. Then, an initial screen such as shown in FIG. 8A or 8B is displayed (step A2). FIG. 8A is an initial screen, which appears when recorded contents are reproduced. FIG. 8B, on the other hand, is an initial screen, which appears when broadcast contents (live) are received and displayed. On the initial screen, an image of contents is displayed on an entire display (monitor 2D screen) 61 (which display mode is hereinafter referred to as "normal view") and the zapping bar 40 is displayed at an upper part on this screen.

As shown in FIGS. 8A and 8B, at the left end of the zapping bar 40, a channel name, that is, a program category (genre) is displayed and, on its right side, a program title of the contents classified for each category and the like are displayed. On the zapping bar 40, an area in which a category name is displayed is referred to as a category display portion 40*a* and an area in which a program title name is displayed is referred to as a title display portion 40*b*. For example, the zapping bar 40 for reproducing the recorded contents includes information of whether the recorded contents have been viewed, recorded date (broadcast date), whether a program is protected, whether contents have been recorded manually or automatically, etc. This zapping bar 40 is formed on the basis of the above-mentioned contents-management table (see FIG. 2).

When the right and left cursor keys are operated using the above-mentioned remote controller 60 (see FIG. 4), the zapping bar 40 is displayed as if sliding horizontally (in the right and left directions). When the up and down cursor keys are operated, on the other hand, the title display portion 40*b* of the zapping bar 40 is displayed as if sliding vertically (in the up and down directions).

Figure 9:
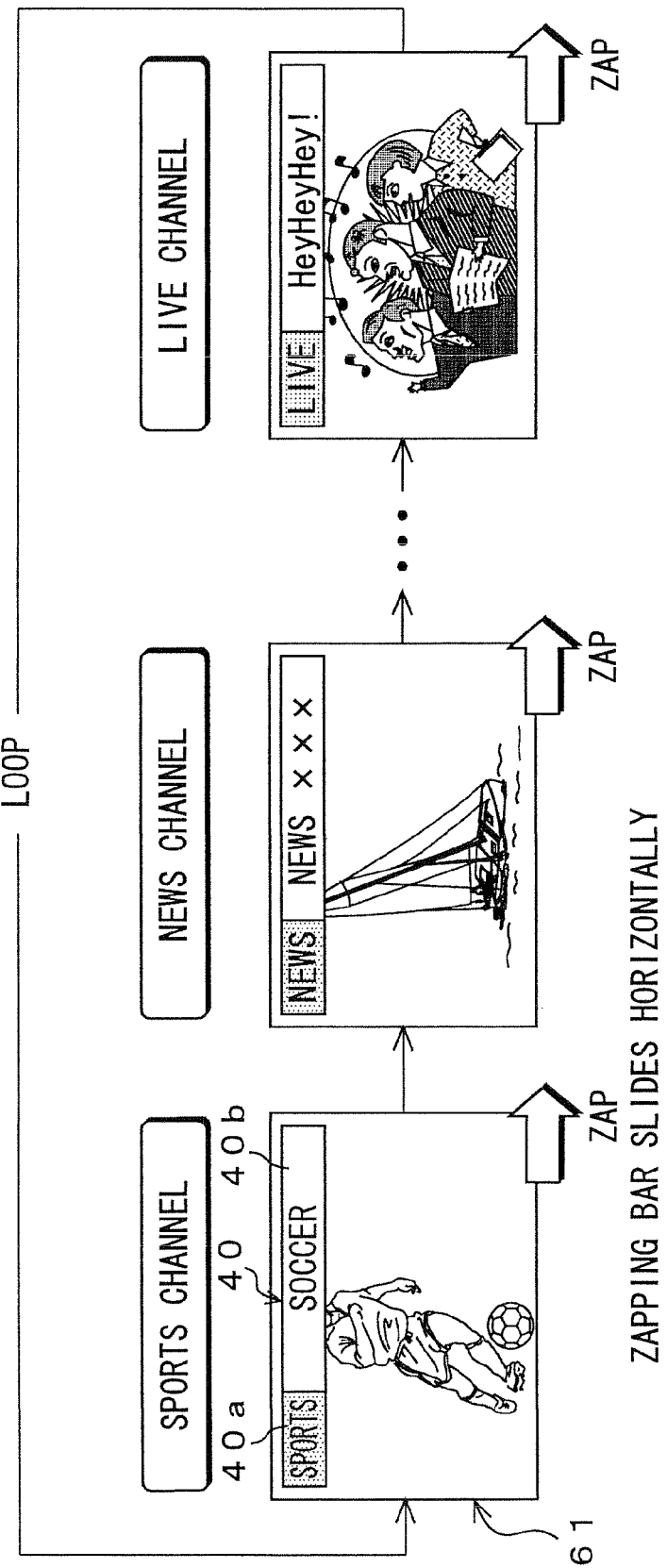
FIG. 9 is a conceptual diagram for showing an example of screen transition by zapping.

Next, at step A3 of FIG. 5, a category of the contents desired to be viewed is selected. FIG. 9 is a conceptual diagram for showing an example of screen transition by zapping. As shown in FIG. 9, a category of the recorded contents being currently selected is, for example, "sports". If a category other than "sports" is retrieved, that is, zapped in this case, the category displayed on the screen is switched using the right and left cursor keys on the remote controller 60 (see FIG. 4) (step A4).

Then, a zapping bar 40 in which "sports" is displayed in the category display portion 40*a* and "soccer" is displayed on the title display portion 40*b* moves, for example, rightward and disappears and, instead, a zapping bar 40 in which "news" is displayed in the category display portion 40*a* and "news xxx" is displayed on the title display portion 40*b* appears from the left side and is displayed at the upper part on the screen. Further, when display of this zapping bar 40 is switched, an image of the recorded contents whose program title is "news xxx" is displayed on the screen correspondingly (step A5).

After the categories of contents are switched, the process returns to the step A3 of FIG. 5. If the category desired to be retrieved is "news", the process goes to step A6. If a category other than "news" is to be retrieved, the process goes to step A4 again for zapping.

In such a manner, over steps A3, A4, and A5, the right and left cursor keys on the remote controller 60 can be operated to sequentially switch the "categories" shown in FIG. 2. For example, when the rightward cursor key of the right and left cursor keys is operated, display of the category display portion 40*a* of the zapping bar 40 is switched to "news", "music", "movie", "variety", "recency", "live", "sports", and "news" in this order. If the leftward cursor key of the right and left cursor keys is operated, on the other hand, the display of the category display portion 40*a* of the zapping bar 40 is switched to "news", "sports", "live", "recency", "variety", "movie", "music", and "news" in this order.

That is, a category displayed in this zapping bar 40 is equal to a category written in the management table (see FIG. 2). Further, category switching order in the zapping bar 40 is adapted to be equal to order in which the categories are arranged in the management table. Furthermore, in the zapping bar 40, these categories are displayed as looped automatically. By operating the right and left cursor keys on the remote controller 60, it is possible to make switchover between the recorded contents and seamless switchover between the recorded contents and live broadcasting.

It is to be noted that at this step A3, category display of the zapping bar 40 is set to, for example, "sports".

Figure 10:
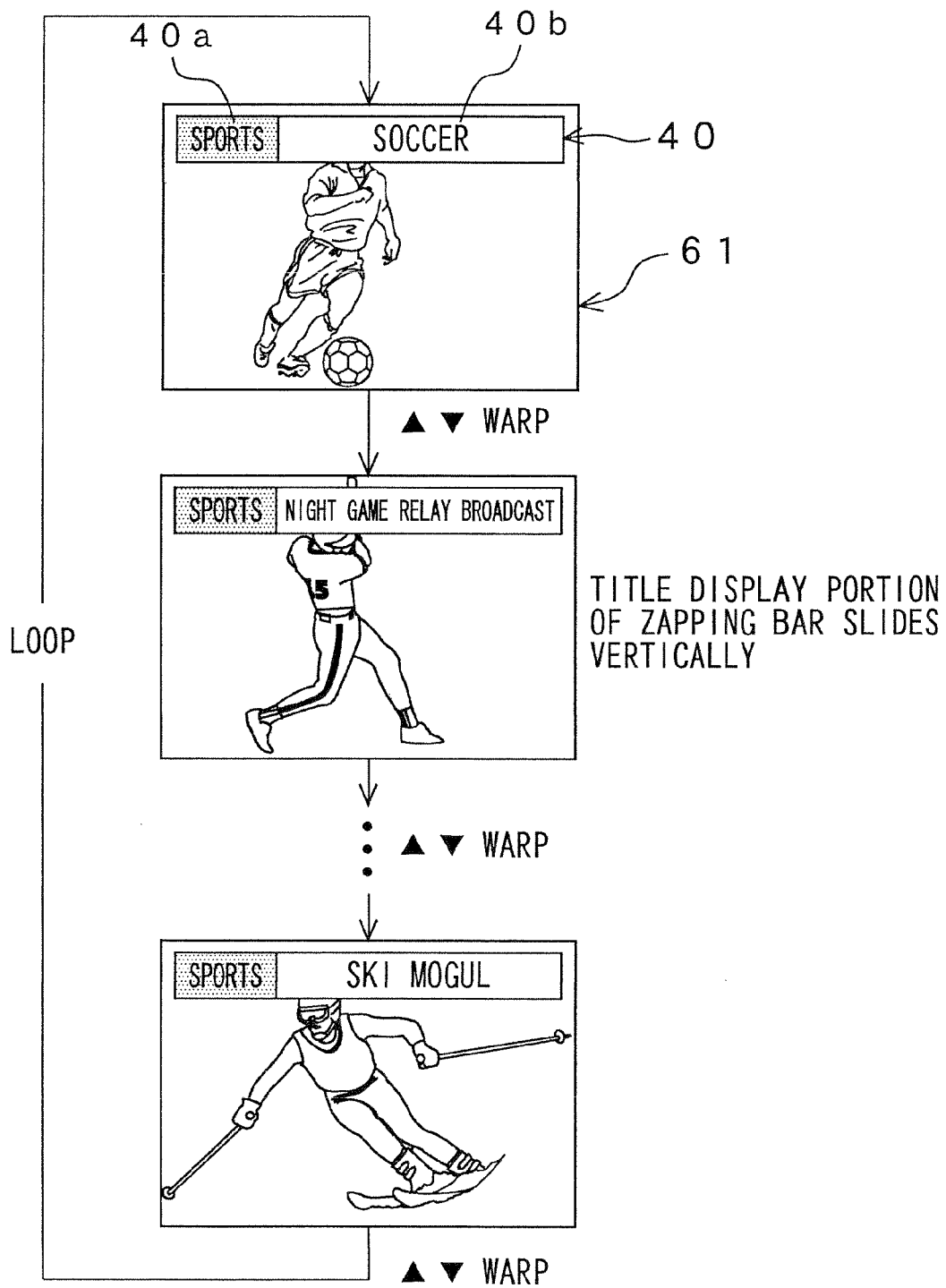
FIG. 10 is a conceptual diagram for showing an example of screen transition by warping.

After "sports" is selected as the category at step A3 of FIG. 5, the process goes to step A6. At step A6, the process searches the recorded contents belonging to the selected category for broadcast contents desired to be viewed. FIG. 10 is a conceptual diagram for showing an example of screen transition by warping. In FIG. 10, the category of the recorded contents currently selected is "sports" and "soccer" is selected from among the program titles recorded so as to belong to this "sports". If any other recorded contents whose category belongs to "sports" is retrieved, that is, warped, in this case, the up and down cursor keys on the remote controller 60 (see FIG. 4) are operated to switch the recorded contents displayed on the screen (step A7).

Then, a zapping bar 40 in which "sports" is displayed in the category display portion 40a and "soccer" is displayed in the title display portion 40b disappears and a zapping bar 40 in which "sports" is similarly displayed in the category display portion 40a and "night game relay broadcast" is displayed in the title display portion 40b is displayed at the upper part on the screen. Further, when display of this zapping bar 40 is switched in such a manner, an image of the recorded contents whose program title is "night game relay broadcast" is displayed on the screen (step A8).

After the program titles are switched, the process returns to step A6 of FIG. 5. In a case where warping is performed again, the process goes to step A7. In a case where no warping is performed, on the other hand, the process goes to step A9.

In such a manner, over steps A6, A7, and A8, by operating the up and down cursor keys on the remote controller 60, only the program titles that belong to a category of "sports" written in the management table (see FIG. 2) are displayed one by one in chronological order. For example, when the downward cursor key of the up and down cursor keys is operated, display of the title display portion 40b of the zapping bar 40 is switched to "night game relay broadcast", . . . , "ski mogul", "sports news xxx", "night game ○ △□ relay broadcast", "soccer", and "night game relay broadcast" in this order. By operating the upward cursor key, on the other hand, display of the title display portion 40b of the zapping bar 40 is switched to "night game relay broadcast", "soccer", "night game ○△□ relay broadcast", "sports news xxx", "ski mogul", . . . , and "night game relay broadcast" in this order.

That is, the program titles displayed in the zapping bar 40 are equal to the program titles written in the management table (see FIG. 2). Further, a switching order of the program titles in the zapping bar 40 is adapted to be equal to the order in which the program titles are arranged in the management table. Furthermore, in the zapping bar 40, these program titles are displayed as looped automatically in the same category. By operating the up and down cursor keys on the remote controller 60, it is possible to make seamless switchover between the recorded contents classified into the same category. At this step A6, a program title to be displayed in the zapping bar 40 is set to, for example, "night game relay broadcast", which belongs to a category of "sports".

After warping is over at step A6 of FIG. 5, the process goes to step A9. At step A9, the process decides whether "night game relay broadcast" selected at step A6 is to be viewed. To perform zapping or warping again without viewing "night game relay broadcast" in this case, the process returns to step A3. To view "night game relay broadcast", on the other hand, the user presses the determination button 44 on the remote controller 60 (step A10).

Then, an image of "night game relay broadcast" is reproduced on the screen. If, in this case, this "night game relay broadcast" is new, that is, has not yet been viewed, the image is reproduced from the beginning of "night game relay broadcast". Further, if this "night game relay broadcast" is left as stopped during a reproduction thereof, the reproduction restarts at a point (hereinafter referred to as "resume point" also) where its reproduction has been stopped. In, for example, two seconds after this determination button 44 is pressed, the zapping bar 40 disappears from the screen (step A10). This finishes switching operation of the contents shown in FIG. 5.

It is to be noted that to retrieve any other contents when "night game relay broadcast" is being viewed or after it is viewed, the user presses the screen display button 45 on the remote controller 60 (step A1). This causes the zapping bar 40 to be displayed again at the upper part on the screen of the display 61.

Figure 11:
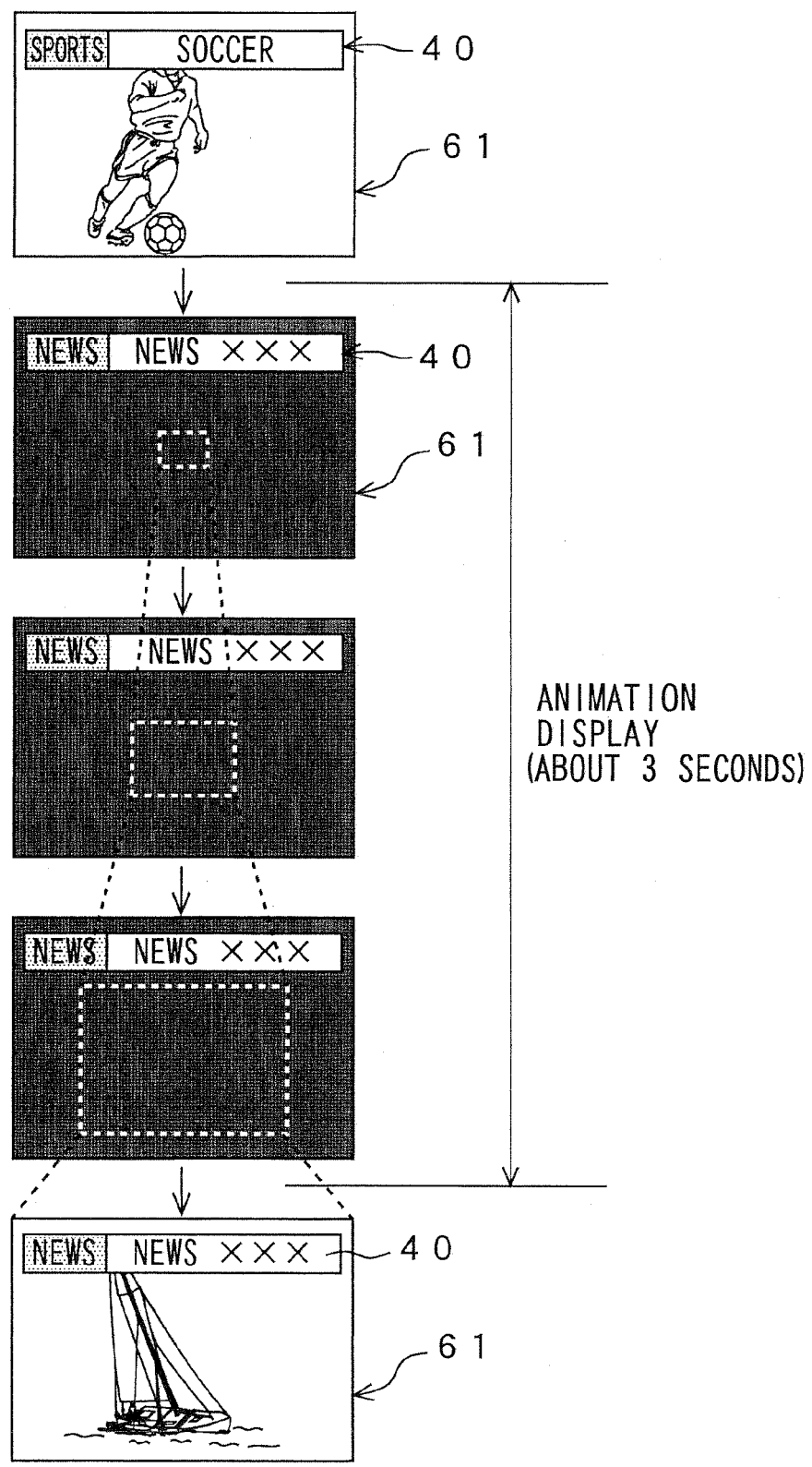
FIG. 11 is a conceptual diagram for showing a display example of an animation.

FIG. 11 is a conceptual diagram for showing a display example of an animation. As described above, an image to be displayed on the screen is switched by zapping or warping. For example, to switch an image from "soccer" to "news", in FIG. 3, selection information indicating that "news" has been selected by the user is delivered to the CPU 33, in response to which images of "news" etc. are called from the HDD 29. Therefore, in this image switching, there occurs a time lag of about three seconds during which no image appears on the screen. To bridge this time lag, a screen frame (frame portion) referred to as an animation is displayed.

By this animation, switching of a relevant image program is assimilated to a process of a post-switching image expanding from, for example, a midpoint of the screen gradually. During switching of the image displayed on the screen, the user feels as if he or she is watching an image switching process and can view the screen without uncomfortable feeling as compared to a case where the image is switched suddenly or a case where nothing appears on the screen for about three seconds.

In such a manner, an image retrieval assisting method related to the embodiment of the present invention assists retrieval of an image program (contents) in a recording/reproducing apparatus for recording reproducing image programs, a reproducing apparatus for reproducing image programs, a TV set having a recording/reproducing function, etc., the method comprising the steps of defining beforehand classification criteria (criterion) for classifying the contents into a plurality of categories, acquiring EPGs of the contents and classifying the EPGs into the categories in accordance with the classification criteria (criterion), and horizontally displaying the categories defined by the classification criteria (criterion) on a monitor screen in a selectable manner and vertically displaying only the EPGs that are classified into a selected one of the categories on the monitor screen in a selectable manner.

Therefore, for example, the user can select a category of image programs he or she wishes to view with him or her retrieving the categories of contents horizontally and he or she can vertically retrieve the image program he or she wishes to view with him or her watching only the EPGs of image programs classified into the selected category on the monitor screen.

This enables the user to easily retrieve the contents he or she wishes to view from among a number of image programs (recorded contents or contents on air) and quickly view his or her desired contents. Further, program information belonging to a category other than the selected category is not displayed on the monitor screen and furthermore an image that corresponds to the program information is displayed on the screen, so that it is possible to prevent the user from making a mistake or being confused in channel selection. Even when the user has not yet determined what program he or she is to view, he or she can easily find image programs that match his or her preference based on a category.

It is to be noted that settings of the image retrieval assisting apparatus 100 or the TV set 200 may be altered so that the zapping bar 40 may disappear automatically depending on whether the key operation on the remote controller 60 has been performed over steps A1-A10 of the flowchart (example of switching operation for contents) shown in FIG. 5. For example, time-limited steps T1 and T2 may each be inserted immediately after step A3 in FIG. 5 (see FIG. 6). Further, time-limited steps T3 and T4 may each be inserted immediately after step A6 of FIG. 5 (see FIG. 6). Steps A1-A11 shown in FIG. 6 perform the same processes as the steps A1-A11 of FIG. 5 respectively and so their description is omitted.

Figure 6:
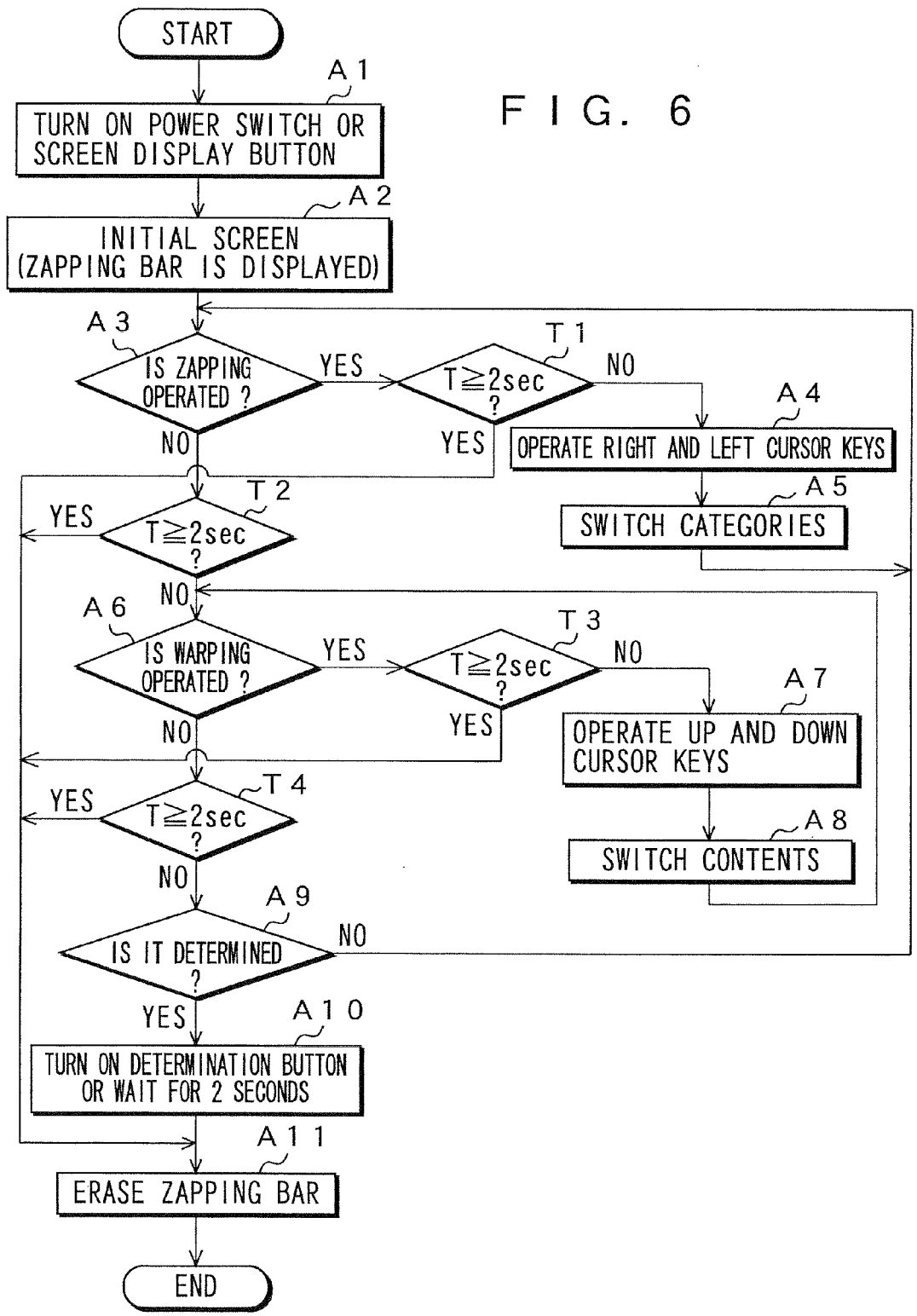
FIG. 6 is a flowchart for showing another operation example of contents switching.

Each of the Steps T1-T4 shown in FIG. 6 relates to time-limiting step. For example, in an example of switching operation for contents shown in FIG. 6, settings are made so that if a next key operation is not performed within two seconds after the zapping bar 40 is displayed or a right or left (or up or down) cursor key is operated, the zapping bar 40 disappears automatically and recorded contents displayed on the screen is reproduced (in the case of live broadcasting, broadcast contents are televised as they are). In the case of stopping retrieval of contents over steps A1-A10 of the flowchart, it is possible to save labor of eliminating the zapping bar by pressing the determination button 44 on the remote controller 60, which is convenient.

(2) FIRST EXAMPLE

Figure 12:
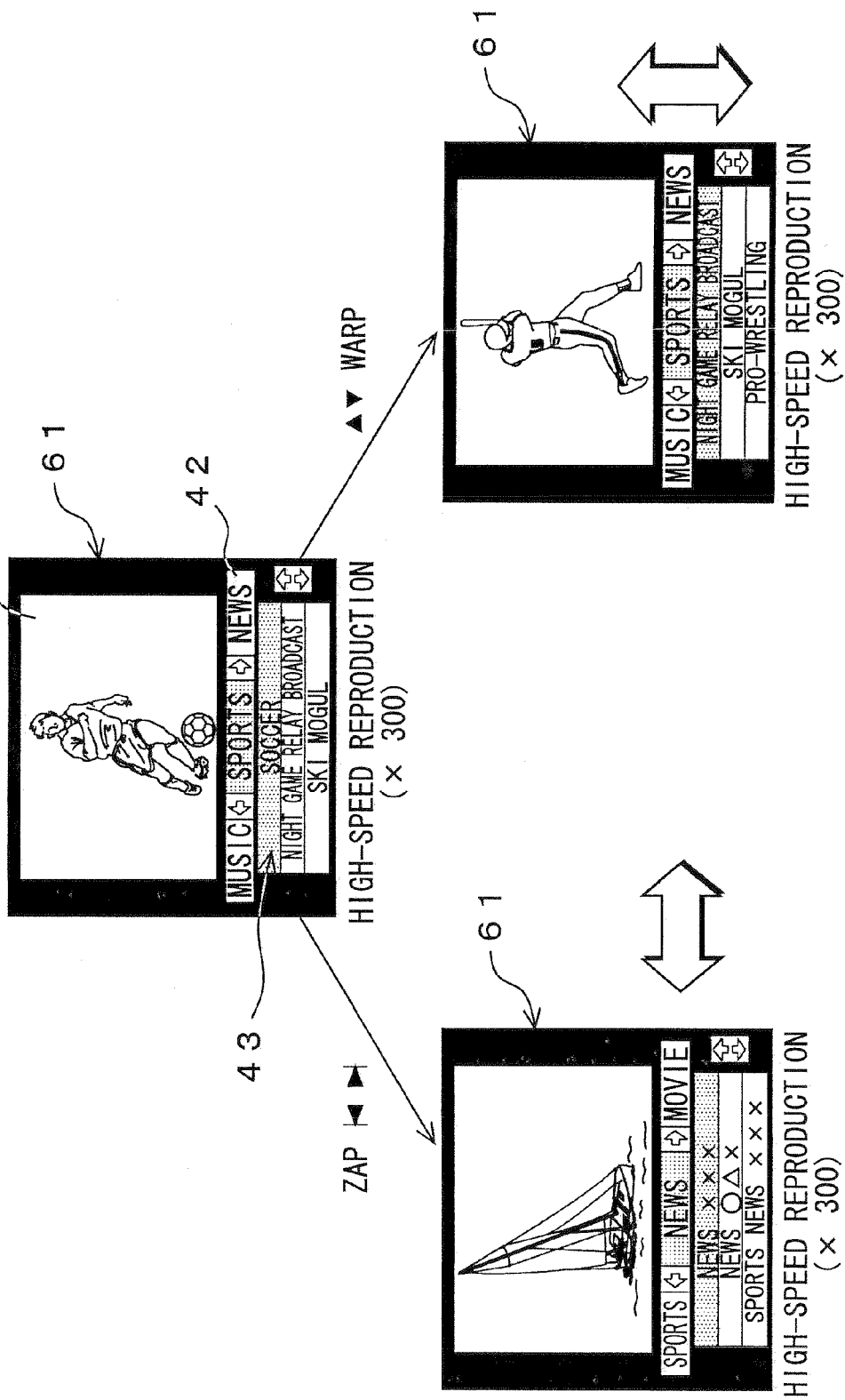
FIG. 12 is a conceptual diagram for showing an example of retrieving contents in a high-speed preview mode.

FIG. 12 is a conceptual diagram for showing an example of retrieving contents in a high-speed preview mode related to the first example of the present invention.

The present first example will be described with reference to a case where, when retrieving desired contents along the flowchart of FIG. 5, instead of using the zapping bar 40, a category name and a program title name are displayed on the screen as separated from each other and an image to be displayed at the time of retrieval is reproduced at a high speed. The other conditions are the same as those for the embodiment. Therefore, components having the same symbols as those in the embodiment have the same function or perform the same processing and so their description is omitted.

If the View button 46 (see FIG. 4) on the remote controller 60 is pressed at any given one of steps A1-A11 of the flowchart of FIG. 5 or 6, an image is reduced in size and displayed along with a category bar 42 and a contents-list 43 on the monitor screen 61 as shown in FIG. 12.

The category bar 42 corresponds to the category display portion 40a of the zapping bar 40 and displays in it three categories horizontally (in right and left directions). A selected category is displayed at a midpoint of this category field. In FIG. 12, a category of "sports" is selected. The category selection is performed by operating the right and left cursor keys on the remote controller 60 as in the case of the normal view mode (entire screen display mode) described with the embodiment.

The contents-list 43 corresponds to the title display portion 40b of the zapping bar 40 and shows three program titles vertically (up and down directions). Further, although not shown, this contents-list 43 displays information of whether recorded contents have been viewed, a recorded date (broadcast date), whether a program is protected, whether a content has been recorded manually or automatically, etc. Selected broadcast contents are displayed as hatched in the contents-list 43 on the screen. In FIG. 12, "soccer" is selected as the contents. This category is also selected by operating the up and down cursor keys on the remote controller 60 as in the case of the normal view mode.

Further, in FIG. 12, on a contents display screen 41 reduced in size and displayed together with the contents-list 43 and the category bar 42, selected contents are reproduced at a high speed of, for example, 300 times an ordinary speed. Such a display mode is referred to as a high-speed preview mode. In the high-speed preview mode, the recorded contents belonging to a selected category are sequentially reproduced at a high speed (×300) starting from the more recent contents in terms of recorded time (that is, downward from the top in the management table). For example, when high-speed reproduction of a soccer game is finished, a night game relay broadcast of contents belonging to a category of "sports" is reproduced.

Furthermore, when the recorded contents belonging to the selected category are all reproduced at a high speed, the most recently recorded contents belonging to that category are automatically reproduced again at a high speed (in a loop).

Further, if contents are switched with zapping by operating the right and left cursor keys on the remote controller 60 during high-speed reproduction, the recorded contents are reproduced at a high speed in a loop within a post-switching category. When warping is performed by operating the up and down cursor keys on the remote controller 60, the recorded contents selected next are reproduced at a high speed.

If the determination button on the remote controller 60 is pressed during such a high-speed reproduction, the recorded contents which have been reproduced at a high speed at the time of this pressing of the determination button are selected and reproduced from the beginning (exordium) thereof at the ordinary speed (×1).

Furthermore, even if zapping or warping is performed during high-speed reproduction, the recorded contents are not selected unless the determination button 44 on the remote controller 60 is pressed. For example, when the View button 46 on the remote controller 60 is pressed during high-speed reproduction, retrieval operation of contents is finished. Then, at a resume point of the recorded contents that have been reproduced before the retrieval operation, an ordinary-speed reproduction of the contents starts as displayed on the entire screen.

In such a manner, in the high-speed preview mode, three categories are displayed and at least three title names of broadcast contents belonging to a selected one of the categories are displayed, so that the user can know at a glance what categories are arranged before and after the selected one and what information of contents which belong to the selected category is recorded. Further, images belonging to a selected category are reproduced in a loop at a high speed, so that the user can confirm details of the recorded contents visually.

Therefore, even if there are a lot of recorded contents, the user can quickly access his or her desired one with him or her confirming the details of the contents only by operating the cursors vertically and horizontally.

Further, as in the case of the normal view mode, it is possible to switch seamlessly to a live broadcast during retrieval of recorded contents. However, in this case, of course, the live broadcast cannot be reproduced at a high speed (×300) but at an ordinary speed (×1).

(3) SECOND EXAMPLE

FIG. 13 is a conceptual diagram for showing an example of screen transition in a title list view mode according to the second example of the present invention. The present second example will be described with reference to a case where a title list view is prepared in which a category name and a program title name are separated from each other and displayed on the screen, so that, when retrieving desired broadcast contents along the flowchart of FIG. 5, the screen display mode is switched arbitrarily among this title list view, the above-mentioned high-speed preview, and normal view. The other conditions are the same as those for the embodiment.

Therefore, components having the same symbols as those in the embodiment have the same function or perform the same processing and so their description is omitted.

The title list view refers to such a display mode that, as shown in FIG. 13, the category bar 42 is displayed at the top on the screen and, below this category bar 42, a plurality of program titles of recorded broadcast contents belonging to a category displayed in this category bar 42 is displayed.

Although only one category of "sports" is displayed in the category bar 42 in FIG. 13, three categories may be displayed horizontally (in the right and left directions) as in the case of, for example, the first example. A category to be displayed in the category bar 42 is selected by operating the right and left cursor keys on the remote controller 60. Further, although nine broadcast Contents are displayed in the contents list 43 in FIG. 13, the number of broadcast contents to be displayed is not limited to it; for example, six broadcast contents may be displayed. The contents to be displayed in the contents-list 43 are selected by operating the up and down cursor keys on the remote controller 60. Then, by pressing the determination button on the remote controller 60, the recorded contents thus selected are reproduced starting from its resume point.

Although not shown, in this contents list 43 is displayed information of whether recorded contents have been viewed, a recorded date (broadcast date), whether a program is protected, whether contents have been recorded manually or automatically, etc.

This title list view mode has no image display region and so has an advantage that a plurality of contents belonging to a particular category can be displayed in a larger size or in large number in this mode than in the normal mode and the high-speed preview mode.

Note here that according to this invention, when the desired broadcast contents are retrieved along the flowchart of FIG. 5, the mode can be switched arbitrarily among this title list mode (see FIG. 13), the above-mentioned normal view mode (see FIGS. 8A and 8B), and the high-speed preview mode (see FIG. 12). FIG. 14 is a conceptual diagram for showing an example of screen display mode transition.

By pressing the View button 46 on the remote controller 60, the mode can be switched among the normal view mode, the high-speed preview mode, and the title list view mode as shown in FIG. 14. The screen display mode can be thus switched at any one of steps A1-A11 of the flowchart of FIGS. 5 and 6.

Figure 7:
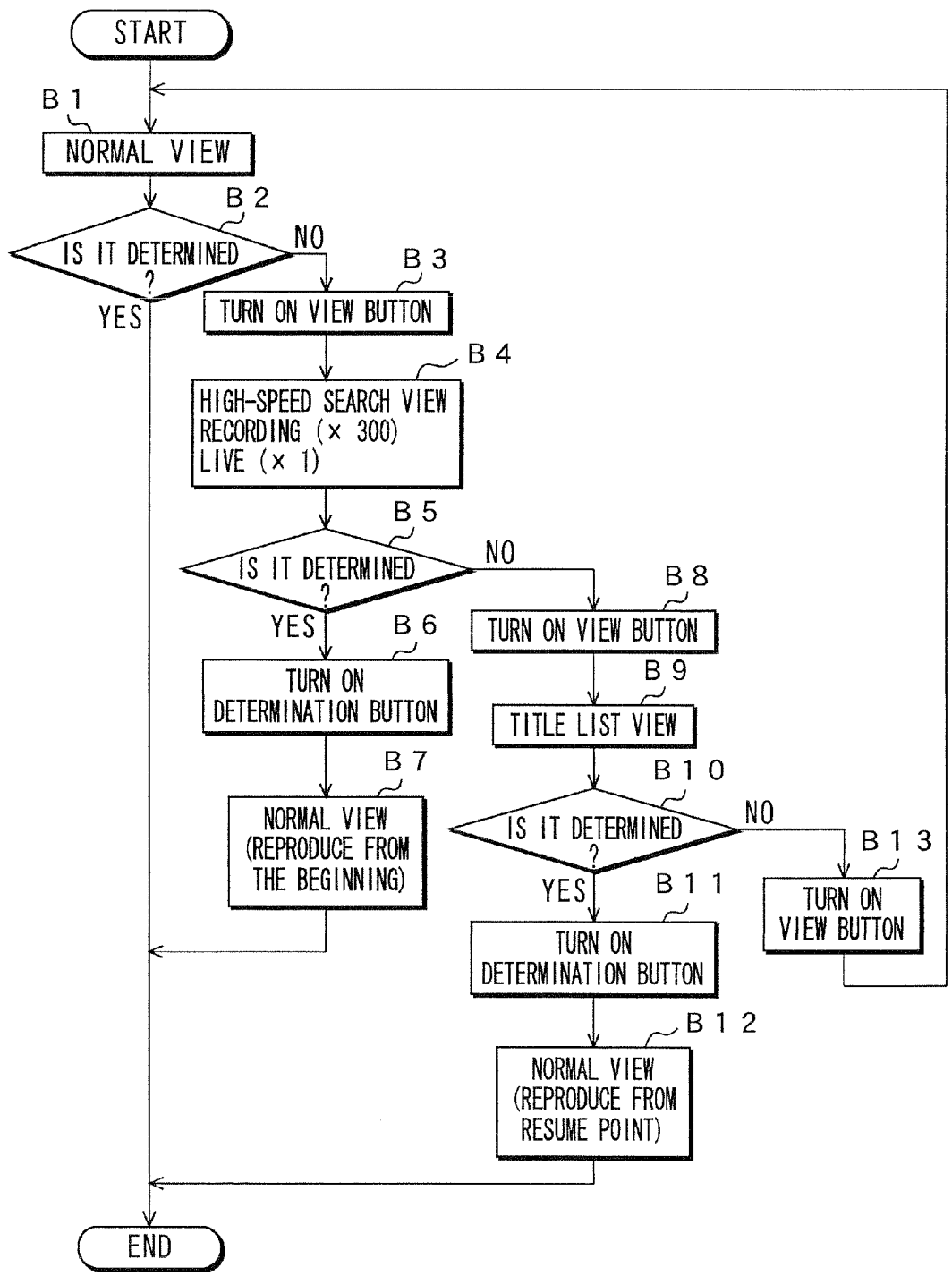
FIG. 7 is a flowchart for showing an operation example of screen display mode switching.

A case is assumed here, for example, where warping is performed at step A7 and recorded contents whose category is "sports" and whose program title is "soccer" are displayed on the screen at step A8 in the flowchart of FIG. 5 (which corresponds to step 31 of FIG. 7). FIG. 7 is a flowchart for showing an example of switching operation of screen display modes.

In this case, at step B2 of FIG. 7, the user decides whether he or she should press the determination button 44 on the remote controller 60. If the determination button 44 is pressed, the process goes to step A11 of the flowchart in FIG. 5 where a reproduction of the recorded contents, "soccer" starts. If the determination button 44 is not pressed, on the other hand, the process goes to step B3 of the flowchart in FIG. 7.

Next, at step B3 of FIG. 7, the user presses the View button 46 on the remote controller 60. Then, screen display switches from the normal view mode to the high-speed preview mode (step B4). In the high-speed preview mode, as described with the first example, an image of the recorded contents is reproduced at a high speed of 300 times an ordinary speed, for example. At this step B4, by operating the right and left (or up and down) cursor keys on the remote controller 60, zapping or warping can be performed.

Next, at step B5, the user decides whether he or she should press the determination button on the remote controller 60. If the user presses the determination button (step B6), the screen display is switched to the normal view mode where a reproduction of "soccer" starts (step B7). If the determination button is not pressed, on the other hand, the user presses the View button 46 on the remote controller 60 (step B8). Then, the screen display is switched from the high-speed preview mode to the title list view (step B9). At this step B9 also, by operating the right and left (or up and down) cursor keys on the remote controller 60, zapping or warping can be performed.

Next, the user decides whether he or she should press the determination button 44 on the remote controller 60 at step B10. If the determination button 44 is pressed (step B11), the screen display is switched to the normal view mode and a reproduction of "soccer" starts at its resume point (step B12). If the determination button 44 is not pressed, on the other hand, the user presses the View button 46 at step B13, so that the screen display returns to the normal view (step E1).

In such a manner, in any of the screen display modes, by operating the right and left (or up and down) cursor keys on the remote controller 60, zapping or warping can be performed. Further, by pressing the View button 46 on the remote controller 60 repeatedly, the screen display modes can be switched sequentially in a loop as shown in FIG. 14. In this second example, the screen display mode can be switched easily in accordance with user's preference, thus allowing the recorded contents to be retrieved further more efficiently.

Although the embodiment of the present invention has been described with reference to such a configuration that categories of each program (for each program attribute) are displayed horizontally on the screen in such a manner that they can be scrolled and information of programs classified into a selected category is displayed vertically on the screen in a selectable manner, a display direction of the program categories and that of the information of programs classified into the selected category are not limited to this configuration; for example, the program categories may be displayed vertically in such a manner that they can be scrolled and the information of programs classified into the selected category may be displayed horizontally in a selectable manner.

Further, the display configuration is not limited to such a combination of the vertical and horizontal directions; for example, each category (each program attribute) may be displayed horizontally on the screen in such a manner that it can be scrolled and the information of programs classified into the selected category is displayed in a selectable manner in a direction at a predetermined angle (e.g., 45 degrees, 60 degrees, etc.) with respect to the above-mentioned horizontal direction.

Probability of Utilized Industrialization

The present invention is extremely well applicable to a method and apparatus for retrieving a desired program from among a number of recorded TV programs in a TV receiver having a function to record and reproduce TV programs.

The invention claimed is:

1. A method for assisting retrieval of contents, comprising the steps of:
    classifying the contents into a plurality of categories;
    displaying a content category in a first area on a screen;
    displaying a title list associated with the content category in a second area on the screen;
    selecting a title included in the title list, and
    reproducing and displaying content associated with the title in a fast-forwarding manner in a third area on the screen,
    wherein upon a selection of a new category, recorded contents associated with titles included in the new category are reproduced in a loop at a high speed so that the most recently recorded contents belonging to the new category are automatically reproduced again when the recorded contents belonging to the new category have all been reproduced.

2. The method according to claim 1,
wherein a selected title is displayed at a fixed position on the screen.

3. The method according to claim 1,
wherein the contents comprise recorded content and live content.

4. An apparatus for assisting retrieval of contents comprising:
- classifying means for classifying the contents into a plurality of categories;
- first displaying means for displaying a content category in a first area on a screen;
- second displaying means for displaying a title list associated with the content category in a second area on the screen;
- selecting means for selecting a title included in the title list, and
- reproducing means for reproducing and displaying content associated with the title in a fast-forwarding manner in a third area on the screen,
- reproducing, in a loop at high speed, recorded contents associated with titles included in the new category upon a selection of a new category so that the most recently recorded contents belonging to the new category are automatically reproduced again when the recorded contents belonging to the new category have all been reproduced.

5. The apparatus according to claim 4,
wherein a selected title is displayed at a fixed position on the screen.

6. The apparatus according to claim 4,
wherein the contents comprise recorded contents and live contents.

7. The apparatus according to claim 4 further comprising remote control means,
wherein the remote control means is equipped with a cross key, and
wherein by operating the cross key horizontally or vertically, categories or titles in the title list is retrieved respectively.

\* \* \* \* \*